US010633780B2

United States Patent
Lee

(10) Patent No.: US 10,633,780 B2
(45) Date of Patent: Apr. 28, 2020

(54) WALL-MOUNTED WASHING MACHINE AND INSTALLATION METHOD THEREOF

(71) Applicant: Dongbu Daewoo Electronics Corporation, Seoul (KR)

(72) Inventor: Jong Jin Lee, Seoul (KR)

(73) Assignee: DONGBU DAEWOO ELECTRONICS CORPORATION, Seoul (KR)

( * ) Notice: Subject to any disclaimer, the term of this patent is extended or adjusted under 35 U.S.C. 154(b) by 314 days.

(21) Appl. No.: 15/287,556

(22) Filed: Oct. 6, 2016

(65) Prior Publication Data

US 2017/0362761 A1 Dec. 21, 2017

(30) Foreign Application Priority Data

Jun. 20, 2016 (KR) .......................... 10-2016-0076779

(51) Int. Cl.
| | |
|---|---|
| D06F 37/22 | (2006.01) |
| D06F 39/12 | (2006.01) |
| D06F 37/20 | (2006.01) |
| D06F 37/30 | (2020.01) |
| D06F 39/08 | (2006.01) |
| F16B 13/06 | (2006.01) |
| F16B 13/14 | (2006.01) |

(52) U.S. Cl.
CPC .......... *D06F 37/22* (2013.01); *D06F 37/203* (2013.01); *D06F 37/304* (2013.01); *D06F 39/083* (2013.01); *D06F 39/088* (2013.01); *D06F 39/125* (2013.01); *F16B 13/063* (2013.01); *F16B 13/141* (2013.01)

(58) Field of Classification Search
None
See application file for complete search history.

(56) References Cited

U.S. PATENT DOCUMENTS 3,848,506 A * 11/1974 Zifferer ................. F16B 13/124
411/17

FOREIGN PATENT DOCUMENTS

| CN | 102121495 | * | 7/2011 | ............. F16B 13/06 |
|---|---|---|---|---|
| CN | 103958763 A | | 7/2014 | |
| JP | 2003-268884 A | | 9/2003 | |
| KR | 20-0202715 Y1 | | 11/2000 | |
| KR | 10-2011-0012731 A | | 2/2011 | |
| KR | 10-2013-0112639 A | | 10/2013 | |

OTHER PUBLICATIONS

Author Unknown; "Manual of Common Building Materials"; Galvanized Cup Head Bolt; Feb. 1, 1998 p. 475-476; ISBN7-5323-4224-7/TU.

* cited by examiner

*Primary Examiner* — Rita P Adhlakha

(57) ABSTRACT

A fastener kit can securely affix a washing machine on a lightweight wall. The washing machine includes a rear panel for coupling to the wall through the fastener kit. A tub configured to contain washing water may be integrally formed with the rear panel. The fastener kit has one end section equipped with a sleeve that can radially expand to form tight contact with the inner surface of a fastening hole on the lightweight wall. The other end section of the fastener kit is coupled to the rear panel. The lightweight wall may be porous with regular or irregular cavities.

11 Claims, 7 Drawing Sheets

WALL-MOUNTED WASHING MACHINE AND INSTALLATION METHOD THEREOF

CROSS-REFERENCE TO RELATED APPLICATION

This application is based on and claims priority from Korean Patent Application No. 10-2016-0076779, filed on. Jun. 20, 2016, the disclosure of which is incorporated herein in its entirety by reference.

TECHNICAL FIELD

The present disclosure relates to wall-mounted washing machines and installation method thereof.

BACKGROUND OF THE INVENTION

A wall-mounted washing machine can be installed on a wall, which is particularly useful for rooms with relatively small spaces.

Generally, a wall-mounted washing machine includes a cabinet, a tub disposed within the cabinet and configured to store washing water, a drum rotatably installed in the tub and configured to accommodate laundry or other washing objects, a drive device configured to supply power to and drive rotation of the drum, a water supply device configured to supply washing water into the tub, and a drain device configured to drain washing water from the tub to the outside of the cabinet.

Once washing operation is started, washing water is supplied into the tub and the drum by the operation of the water supply device. The drum is rotated by the drive device. At the end of washing, washing water in the tub and the drum is drained to the outside of the cabinet by the operation of the drain device.

A wall-mounted washing machine usually is designed with a compact size. For example, it can be installed on a wall of a bathroom that typically has a small area.

However, a porous wall (e.g., having a plurality of cavities) usually lacks the mechanical strength and stability needed to support the weight of a washing machine attached thereto.

In particular, due to vibration caused by the washing machine operation, especially in the dewatering and rinsing cycles, the affixture between the washing machine and the wall may become loose. In a worse scenario, the washing machine may even fall from the wall, causing damage to the washing machine as well as the wall, and even beyond.

PRIOR ART DOCUMENTS

Patent Documents

Patent Document 1: Korean Patent Application Publication. No. 10-2013-0064624 (published on Jun. 18, 2013)

SUMMARY OF THE INVENTION

In view of the above, embodiments of the present disclosure provide a wall-mounted washing machine capable of being secured and/or affixed to a porous wall having regular or irregular cavities and an installation method thereof.

In accordance with an aspect of the present disclosure, a washing machine includes: a rear panel; and a fastener kit configured to affix the washing machine to a wall through the real panel. The fastener kit includes a first end portion and a second end portion. The first end portion is configured to be disposed in a fastening hole formed in the wall and to radially expand in the fastening hole. The wall includes a plurality of cavities and the second end portion is configured to be coupled to the rear panel.

The washing machine may further include a tub integrally formed with the rear panel and configured to contain washing water and a rotatable drum disposed inside the tub.

Further, a chemical anchor may be disposed in the fastening hole to enhance affixation between the wall and the first end portion.

Further, the fastener kit may include a fastening rod that, when the rear panel is mounted on the wall, includes one end portion inserted in the fastening hole and another end portion inserted in the rear panel.

The fastener kit may further include a sleeve disposed on the one end portion of the fastening rod. A length of the sleeve may be selected based on an insertion length of the fastening rod in the fastening hole.

The fastener kit may further include a pressing nut, wherein tightening the pressing nut along the fastening rod causes the sleeve to radially expand and press against an inner surface of the fastening hole, and a fastening nut configured to fix the another end portion of the fastening rod to the rear panel.

The sleeve may include a cylindrical columnar first sleeve configured to compensate the insertion length of the fastening rod, and a cylindrical columnar second sleeve comprising a slit extending in a longitudinal direction.

The fastener kit may further include a shock-absorbing member disposed between the wall and the rear panel for absorbing vibration caused by an operation of the washing machine.

In accordance with another aspect of the present disclosure, a washing machine includes: an exterior housing; and a rear panel configured to couple the washing machine to a wall through a fastener kit and a chemical anchor. When the rear panel is affixed to the wall, the chemical anchor is disposed in a fastening hole formed in the wall and the fastener kit has one end portion disposed in the fastening hole and configured to radially expand to make contact with the fastening hole, and another end portion coupled to the rear panel.

The fastener kit may include a fastening rod that, when the rear panel is mounted on the wall, has the one end portion inserted in the fastening hole and the another end portion inserted in the rear panel.

The fastener kit may further include a sleeve disposed on the one end portion of the fastening rod, where the sleeve length is selected based on an insertion length of the fastening rod in the fastening hole.

The fastener kit may further include a pressing nut, wherein tightening the pressing nut causes the sleeve to radially expand and press against an inner surface of the fastening hole, and a fastening nut configured to fix the another end portion of the fastening rod to the rear panel.

The sleeve may include a cylindrical columnar first sleeve configured to compensate the insertion length of the fastening rod, and a cylindrical columnar second sleeve comprising a slit extending in a longitudinal direction.

The fastener kit may further include a shock-absorbing member disposed between the wall and the rear panel for absorbing vibration caused by operation of the washing machine.

In accordance with still another aspect of the present invention, method of installing a wall-mounted washing machine on a wall includes: forming a fastening hole on the wall having a plurality of cavities; inserting a fastening rod with a sleeve in the fastening hole; causing the sleeve to radially expand to affix the fastening rod in the fastening hole; and coupling the washing machine to the fastening rod.

The method may further include selecting a length of the sleeve based on an insertion length of the fastening rod inserted into the fastening hole and coupling the sleeve to the fastening rod.

The method may further include disposing a chemical anchor in the fastening hole.

Further, the fastening hole may have a predetermined depth and extends through two or more cavities in the wall.

Further, the sleeve may radially expand to make contact with an inner surface of the fastening hole when a pressure is exerted on one end of the sleeve. Thereby, the sleeve and so the fastening rod makes secure contact with the inner surface of the fastening hole.

Furthermore, vibration caused by washing machine operation in the dewatering and rinsing cycles can be restrained from being transmitted to the porous wall. This can suppress noise caused by the vibration as well as prevent the wall-mounted washing machine from falling from the porous wall by accident.

DETAILED DESCRIPTION

Figure 1:
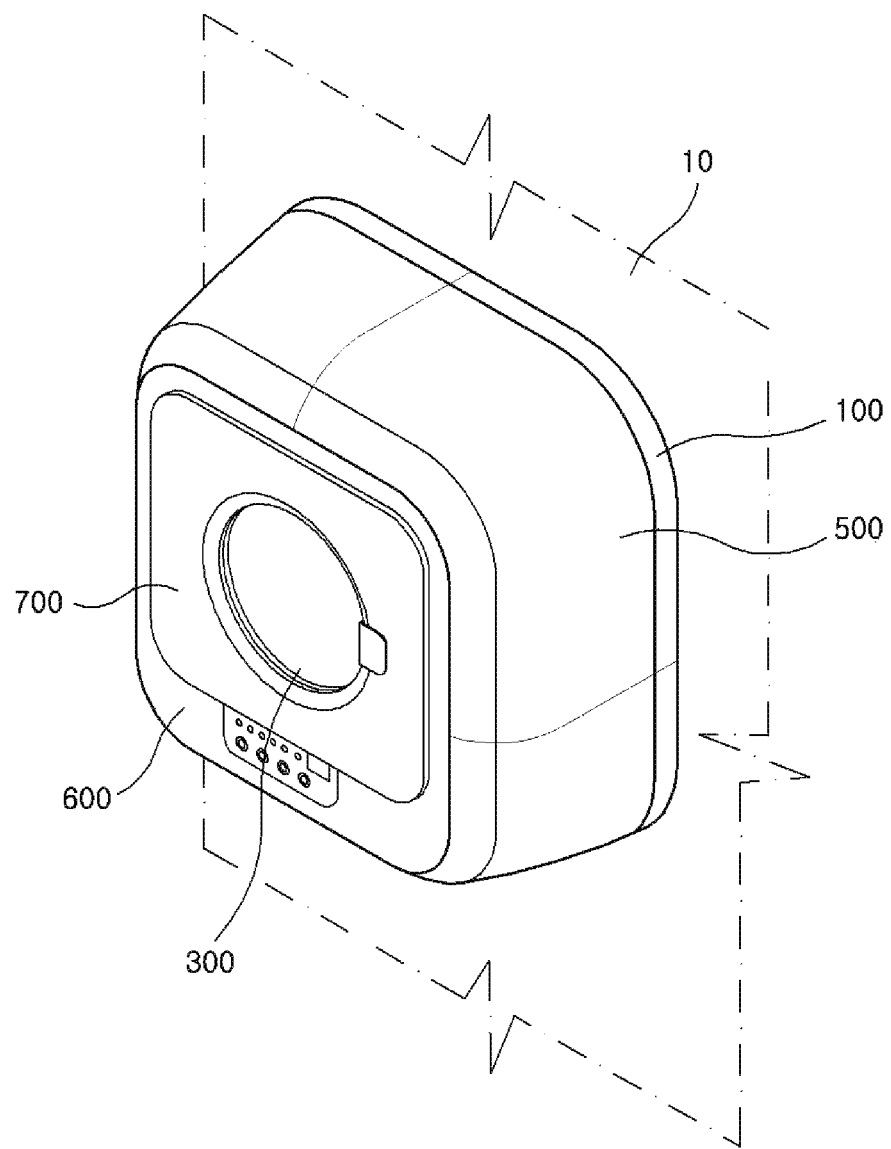
FIG. 1 illustrates a perspective view of an exemplary wall-mounted washing machine according to one embodiment of the present disclosure.

In the following detailed description, reference is made to the accompanying drawings, which form a part hereof. The illustrative embodiments described in the detailed description, drawings, and claims are not meant to be limiting other embodiments may be utilized, and other changes may be made, without departing from the spirit or scope of the subject matter presented here.

One or more exemplary embodiments of the present disclosure will be described more fully hereinafter with reference to the accompanying drawings, in which one or more exemplary embodiments of the disclosure can be easily determined by those skilled in the art. As those skilled in the art will realize, the described exemplary embodiments may be modified in various different ways, all without departing from the spirit or scope of the present disclosure, which is not limited to the exemplary embodiments described herein.

It is noted that the drawings are schematic and are not necessarily dimensionally illustrated. Relative sizes and proportions of parts in the drawings may be exaggerated or reduced in their sizes, and a predetermined size is just exemplificative and not limitative. The same reference numerals designate the same structures, elements, or parts illustrated in two or more drawings in order to exhibit similar characteristics.

The exemplary figures of the present disclosure illustrate exemplary embodiments of the present disclosure in more detail. As a result, various modifications of the drawings are expected. Accordingly, the exemplary embodiments are not limited to a specific form of the illustrated region, and for example, include a modification of a form by manufacturing.

The configuration and operation according to embodiments of the present disclosure will now be described in detail with reference to the accompanying drawings.

Figure 2:
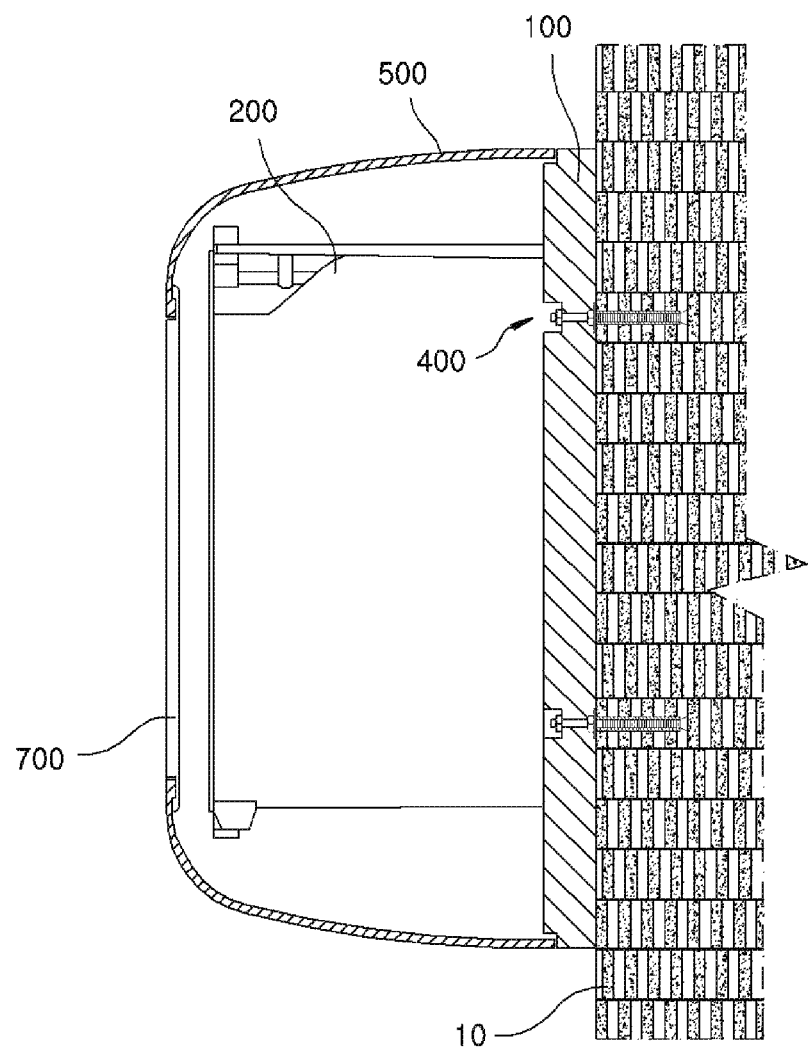
FIG. 2 illustrates a partial sectional view of the exemplary wall-mounted washing machine according to one embodiment of the present disclosure.
Figure 3:
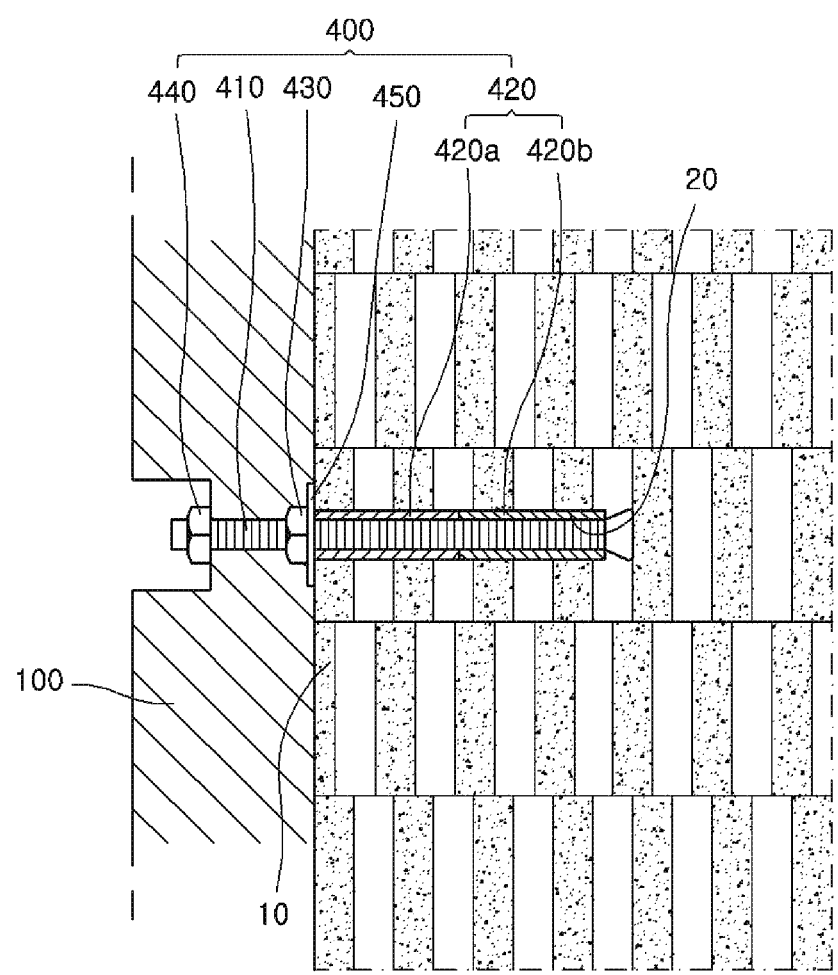
FIG. 3 illustrates an enlarged sectional view of an exemplary coupling mechanism between the wall-mounted washing machine and a lightweight wall according to one embodiment of the present disclosure.
Figure 4:
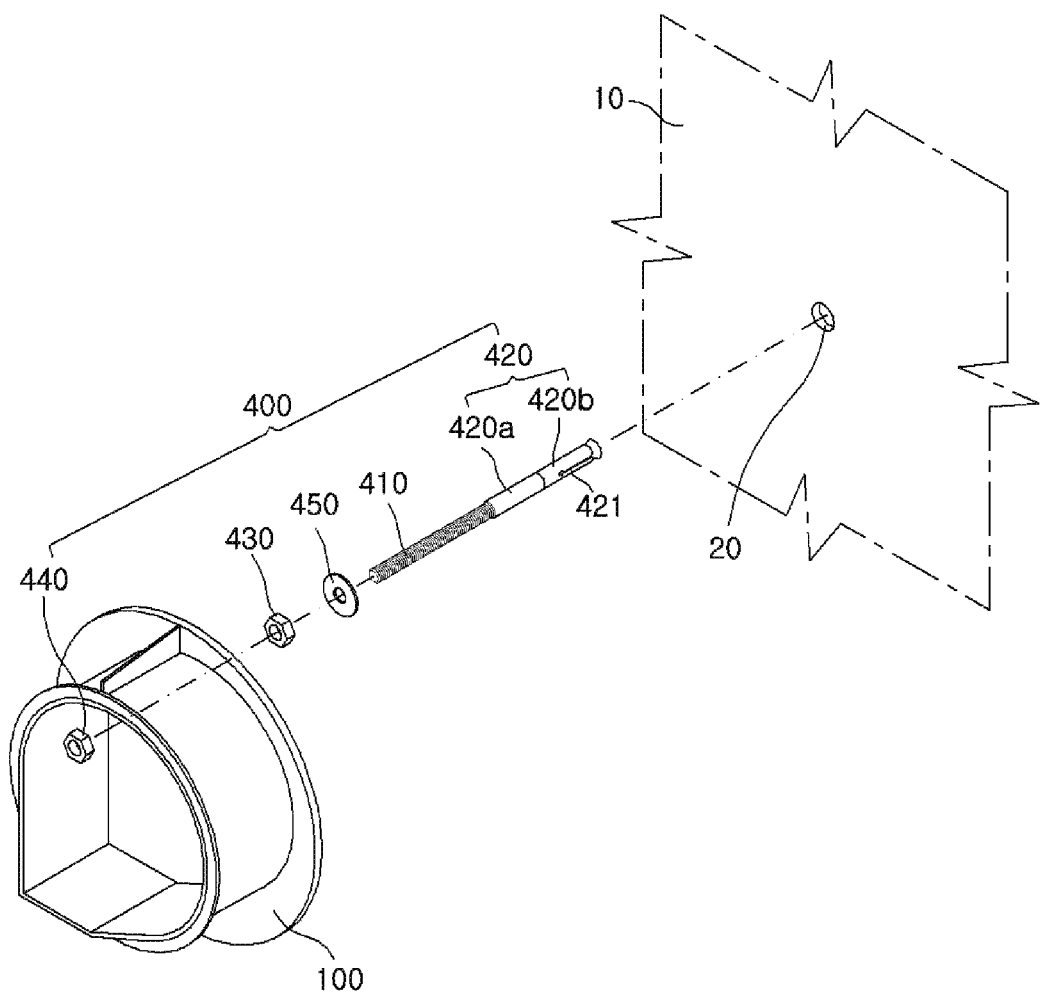
FIG. 4 illustrates an exploded perspective view of the exemplary coupling mechanism by using an exemplary fastener kit.
Figure 5:
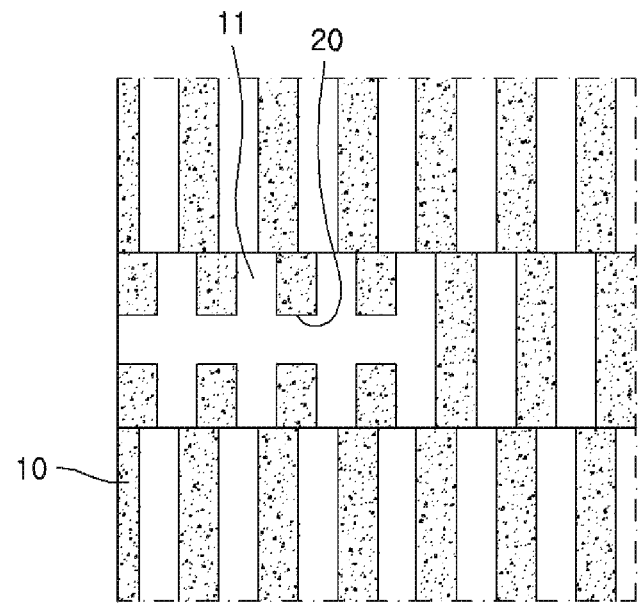
FIG. 5 illustrates a fastening hole formed in the porous wall for installing the wall-mounted washing machine on the porous wall according to one embodiment of the present disclosure.

FIG. 1 illustrates a perspective view of an exemplary wall-mounted washing machine according to one embodiment of the present disclosure. FIG. 2 illustrates a partial sectional view of the exemplary wall-mounted washing machine according to one embodiment of the present disclosure. FIG. 3 illustrates an enlarged sectional view of an exemplary coupling mechanism between the wall-mounted washing machine and a lightweight wall according to one embodiment of the present disclosure. FIG. 4 illustrates an exploded perspective view of the exemplary coupling mechanism between the wall-mounted washing machine and the lightweight wall according to one embodiment of the present disclosure. FIG. 5 illustrates a fastening hole formed in the porous wall to install the wall-mounted washing machine on the porous wall according to one embodiment of the present disclosure.

Referring to FIGS. 1 to 5, the wall-mounted washing machine according to one embodiment of the present disclosure may include a rear panel 100, a tub 200, a drum 300, a housing 500, a cover 600, a front door 700, a chemical anchor 800 and a fastener kit 400. According to the present disclosure, the wall-mounted washing machine can be securely affixed to a porous wall 10 with cavities 11 or otherwise to a lightweight wall, and the cavities may be regular or irregular.

More specifically, the rear panel 100 is a support frame which can be affixed to the porous wall 10 through the fastener kit 400. The rear panel 100 may be rectangular-shaped with round corners. However, the rear panel can be of any suitable shape without departing from the scope of the present disclosure, such as circular or elliptical.

The tub 200 may be integrally formed with the rear panel 100. The integral formation of the rear panel 100 with the tub 200 reduces or eliminates the need for additional components for supporting the tub 200, such as a damper, a damping spring and the like. Thereby, the number of components and the overall size of the wall-mounted washing machine can be reduced. In particular, if the rear panel 100 is made of the same material as the tub 200, for example, a synthetic resin, the rear panel 100 and the tub 200 may be simultaneously formed by performing insert-injection once. This can further reduce the time and cost for manufacturing the rear panel 100 and the tub 200.

The tub 200 is cylindrical reservoir integrally formed with the rear panel 100 and used to contain washing water. The tub 200 may receive washing water from a water supply device (not shown). The washing water may be drained from the tub 200 to the outside through a drain device (not shown). In this regard, the water supply device may include a water supply pipe as a water supply path through which the washing water is supplied. It may also include a water supply valve to control the flow rate of the washing water supplied into the tub 200 through the water supply pipe. The drain device may include a drain pump configured to generate pressure to draw the washing water, a drain pipe providing a path for draining washing water, and a drain port through which the washing water is drained from the drain pipe.

The drum 300 may be rotatably installed in the tub 200. The drum 300 is a cylindrical container configured to accommodate laundry or other washing objects. The drum may rotate in the tub 200. For example, the drum 300 may be driven by a drive device (not shown) and can make half or full rotations within the tub 200. The drive device may include a drive motor and a drive shaft rotatably coupled to the drive motor.

During operation, laundry is loaded into and washed by the drum 300. Rotation of the drum 300 typically causes moderate vibration which can be effectively attenuated due to the firm coupling between the fastener kit 400 and the wall surface. However, vibration generated in the dewatering and rinsing cycles may not be sufficiently attenuated. A shock-absorbing member 450 for attenuating vibration may be disposed between the rear panel 100 and the porous wall 10. The shock-absorbing member 450 is described below in greater detail.

The housing 500 is coupled to the rear panel 100 and contains the tub 200. The housing 500 may be formed in a cylindrical shape with front and rear openings. The rear end portion of the housing 500 may be removably coupled to the rear panel 100 using fixing members (not shown) such as screws or the like.

The cover 600 may be circular-shaped and mounted to the front opening of the housing 500. The lower portion of the cover 600 may have push buttons for a user to control the washing machine, a display window, and the like. An opening portion may be formed in the cents region of the cover 600. The front door 700 covers the tub 200 and may be mounted to the opening portion of the cover 600.

The chemical anchor 800 may significantly enhance the bonding between a fastening rod 410 of the fastener kit 400 and the inner surface of the fastening hole 20. The chemical anchor 800 may be provided in the form of a capsule filled with a bonding material or may be provided in the form of a pack filled with a bonding material so that the bonding material can be injected into the fastening hole 20 using an injection gun.

To sufficiently secure the coupling between the fastening hole 20 and the fastener kit 400 and to stably and firmly fix the washing machine to the porous wall 10 (e.g., a porous block), the fastening hole 20 may extend through two or more large cavities 11 in the porous wall 10. The depth of the fastening hole 20 may be selected based on the strength, material composition and geometry of the porous wall 10. For example, if the porous wall 10 is structurally weak, the length of the fastening hole 20 may be set relatively long to enlarge the contact area and therefore enhance coupling stability.

Figure 6:
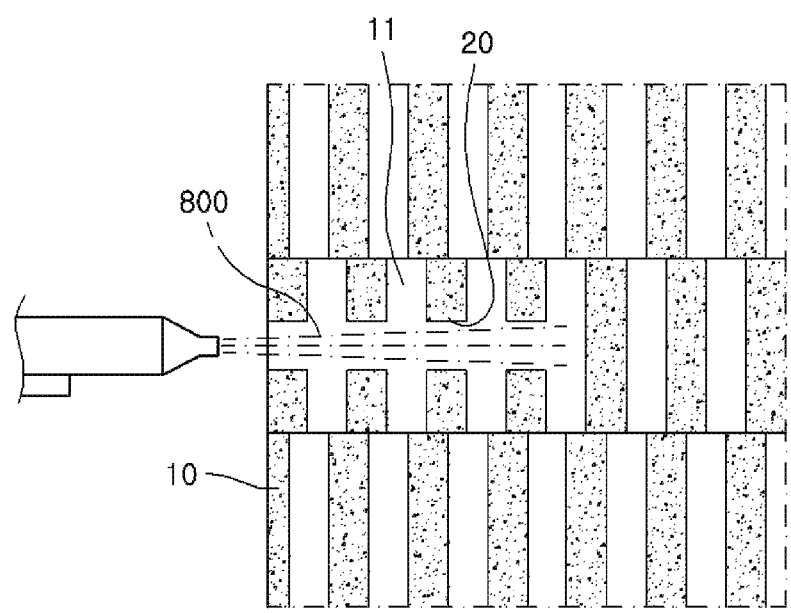
FIG. 6 illustrates a chemical anchor being injected into the fastening hole during installation of the exemplary wall-mounted washing machine on the porous wall according to one embodiment of the present disclosure.

FIG. 6 illustrates a chemical anchor being injected in the fastening hole to install the wall-mounted washing machine on the porous wall according to one embodiment of the present disclosure.

For example, as illustrated in FIG. 5, the fastening hole 20 may be formed in the porous wall 10 and extend through two or more cavities 11 in the porous wall 10. In this case, the fastening hole 20 may be in the porous wall 10 at a specified length using a drill.

As illustrated in FIG. 6, the chemical anchor 800 may be in the form of resin, paste or liquid and can be injected into the fastening hole 20 using an injection gun after the fastening hole 20 is formed in the porous wall 10. In the illustrated embodiment, the fastener kit 400 is inserted in the fastening hole 20 injected with the chemical anchor 800. Alternatively, the chemical anchor 800 is made as a capsule which can be simply placed in the fastening hole 20. The fastener kit 400 is inserted into the fastening hole 20 afterwards.

Thus, according to the present disclosure, in order to firmly fix the washing machine to the porous wall 10, the fastener kit. 400 is fixed to the fastening hole 20 that extends through multiple cavities 11 in the porous wall 10.

The fastener kit 400 may include a fastening rod 410 inserted in the fastening hole 20 of the porous wall 10, a sleeve 420 mounted to one end portion of the fastening rod 410, a pressing nut 430 configured to press the sleeve 420 to fix an outer surface of the sleeve 420 to an inner surface of the fastening hole 20, a fastening nut 440 configured to fix the other end portion of the fastening rod 410 to the rear panel 100, and a shock-absorbing member 450 installed between the porous wall 10 and the rear panel 100 and fitted to the fastening rod 410.

Figure 7:
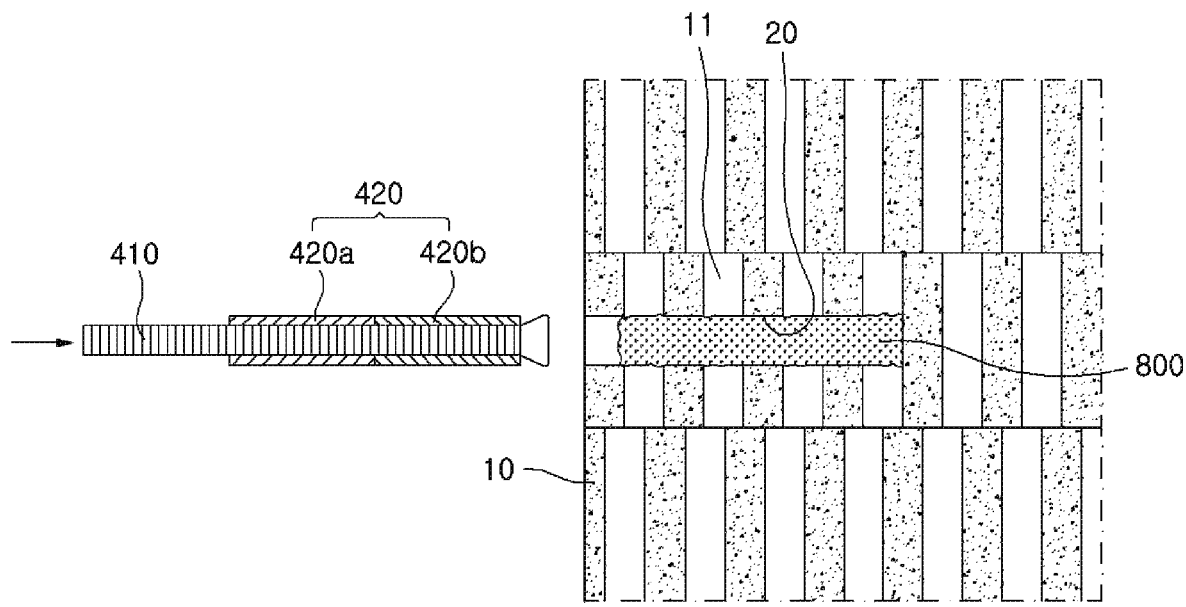
FIG. 7 illustrates an exemplary fastening rod being inserted into the fastening hole during installation of the exemplary washing machine on the porous wall according to one embodiment of the present disclosure.
Figure 8:
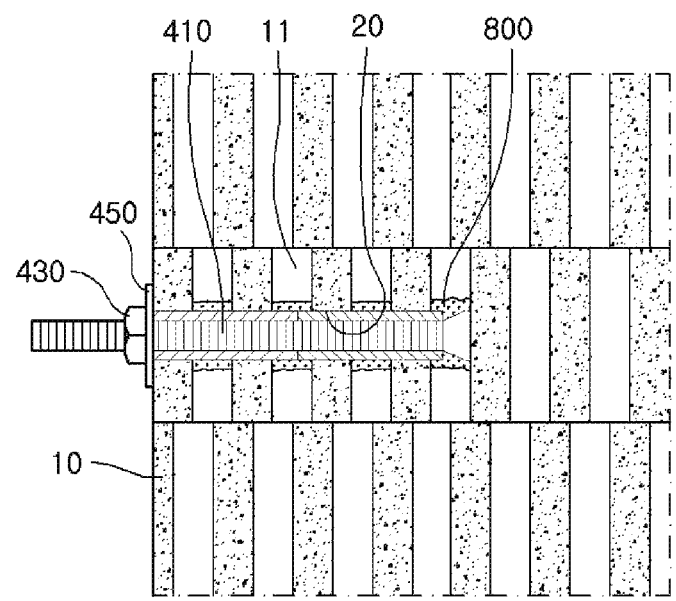
FIG. 8 illustrates the exemplary fastening rod being fixed in the fastening hole during installation of the wall-mounted washing machine on the porous wall according to one embodiment of the present disclosure.

FIG. 7 illustrates the exemplary fastening rod being inserted into the fastening hole during installation of the wall-mounted washing machine on the porous wall according to one embodiment of the present disclosure. FIG. 8 illustrates the exemplary fastening rod being fixed in the fastening hole during installation of the wall-mounted washing machine on the porous wall according to one embodiment of the present disclosure.

For example, as illustrated in FIG. 7, one end portion the fastening rod 410 is inserted in the fastening hole 20 after the chemical anchor 800 is placed in the fastening hole 20 of the porous wall 10. At this time, one or more sleeves 420 may be selectively mounted to one end portion of the fastening rod 410 in consistence with the insertion length of the fastening rod 410 inserted into the fastening hole 20.

As illustrated in FIG. 8, after one end portion of the fastening rod 410 is inserted in the fastening hole 20, the pressing nut 430 is threadedly coupled to the other end of the fastening rod 410. At this time, if the pressing nut 430 is tightened and moves toward the wall along the fastening rod 410, the sleeve 420 is compressed by the pressing nut 430 and in response radially expands. The radial expansion enables the sleeves to press against the inner surface of the fastening hole 20 in high strength. Thus, the fastening rod 410 can be firmly fixed to the porous wall 10.

After the fastening rod 410 is fixed to the porous wall 10, the rear panel 100 is fastened to the other end of the fastening rod 410 using the fastening nut 440. At this time, the shock-absorbing member 450 can be interposed between the porous wall 10 and the rear panel 100, which can restrain vibration caused by washing machine operation from being transferred to the porous wall 10.

In this regard, the sleeve 420 may include one or more sleeves having a length corresponding to the insertion length of the fastening rod 410 in the fastening hole 20. If the length of the sleeve 420 substantially equals the insertion length of the fastening rod 410, one sleeve 420 may be mounted to one end portion of the fastening rod 410. If the length of the sleeve 420 is about half of the insertion length of the fastening rod 410, two sleeves 420 may be placed at the end of the fastening rod 410.

For example, the sleeve 420 may include a cylindrical columnar first sleeve 420a which can compensate the insertion length of the fastening rod 410, and a cylindrical columnar second sleeve 420b which has a slit extending in a longitudinal direction. The second sleeve 420b can radially expand as the pressing nut 430 is tightened.

Thus, the first sleeve 420a may have a length which compensates the insertion length of the fastening rod 410. As the pressing nut 430 is tightened, the slit 421 (see FIG. 4) becomes wider. Thus, the second sleeve 420b can be pressed against and fixed to the inner surface of the fastening hole 20.

In the present embodiment, the fastening hole 20 is formed in the porous wall 10 so as to extend through two cavities 11. Two sleeves 420 (the first sleeve 420a and the second sleeve 420b) are mounted to one end portion of the fastening rod 410, However, the present disclosure is not limited thereto. These configurations may be changed depending on the structure of the porous wall 10 and the installation setting.

In a wall-mounted washing machine according to a modification of the present disclosure, if the porous wall 10 is structurally strong, the chemical anchor 800 may be omitted. In this case, the fastening rod 410, to which the sleeve 420 is mounted, may be inserted into and fixed to the fastening hole 20 without chemical anchor.

For example, the wall-mounted washing machine according to the modification of the present disclosure may include a rear panel 100, a tub 200, a drum 300, a housing 500, a cover 600, a front door 700 and a fastener kit 400. No chemical anchor is used.

Figure 9:
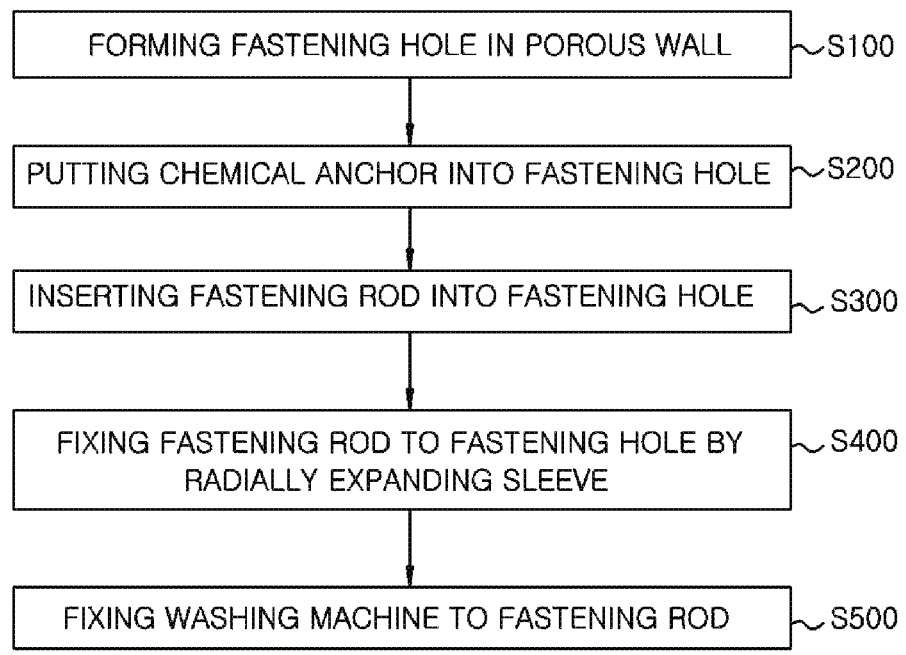
FIG. 9 is a flowchart depicting an exemplary method of installing a washing machine on a lightweight wall according to one embodiment of the present disclosure.

FIG. 9 is a flowchart illustrating an exemplary method of installing a wall-mounted washing machine according to one embodiment of the present disclosure.

As illustrated in FIG. 9, the method of installing a wall-mounted washing machine according to one embodiment of the present disclosure may include: a step (S100) of forming a fastening hole in a porous wall; a step (S200) of disposing a chemical anchor in the fastening hole; a step (S300) of inserting a fastening rod into the fastening hole, where a sleeve is mounted on the fastening rod; a step (S400) of fixing the fastening rod to the fastening hole by radially expanding the sleeve; and a step (S500) of fixing the washing machine to the fastening rod.

At the step (S100) of forming the fastening hole in the porous wall, the fastening hole 20 extending through multiple cavities and having a predetermined length may be formed in the porous wall 10 using a drill. In this case, the length of the fastening hole 20 may be selected based on the strength, material and shape of the porous wall 10. If the porous wall 10 is structurally weak, the fastening hole 20 may be made relatively long to enlarge the contact area between the porous wall 10 and the fastener kit 400.

At the step (S200) of disposing the chemical anchor into the fastening hole, extraneous material can be removed from the fastening hole 20 using a cleaning bush and air. Then, the chemical anchor 800 is disposed in the fastening hole 20. In the present embodiment, the chemical anchor 800 is injected in the fastening hole 20 with an injection gun. Alternatively, a chemical anchor capsule may be readily placed in the fastening hole 20.

At the step (S300), the sleeve 420 having a length corresponding to the depth of the fastening hole 20 is prepared. The sleeve 420 thus prepared is mounted on the fastening rod 410. The fastening rod 410, to which the sleeve 420 is mounted, is inserted into the fastening hole 20.

At the step (S400) of fixing the fastening rod to the fastening hole by radially expanding the sleeve, the sleeve 420 is compressed by the pressing action of the pressing nut 430. As a result, the outer surface of the sleeve 420 is pressed against the inner surface of the fastening hole 20. For example, if the pressing nut 430 is threadedly coupled to the fastening rod 410 and a user turns the pressing nut 430 on the fastening rod 410 to tighten it, a pressure is exerted on the sleeve 420. In response, the sleeve 420 radially expands and therefore presses against and is fixed to the inner surface of the fastening hole 20. Thus, the fastening rod 410 can be firmly coupled to the porous wall 10 through the sleeve.

At the step (S500) of fixing the washing machine to the fastening rod, after one end portion of the fastening rod 410 is fixed on the porous wall, the rear panel 100 is fixed to the other end portion of the fastening rod 410 using the fastening nut 440. At this time, the shock-absorbing member 450 may be interposed between the porous wall 10 and the rear panel 100.

In a method of installing the wall-mounted washing machine according to a modification of the present disclosure, if the porous wall is structurally strong, the step (S200) of putting the chemical anchor into the fastening hole may be omitted. The fastening rod 410 with the sleeve 420 may be inserted in and fixed in the fastening hole 20 without chemical anchor 800.

For example, the method of installing the wall-mounted washing machine according to the modification of the present disclosure may include: a step (S100) of forming a fastening hole in a porous wall; a step (S300) of inserting a fastening rod, to which a sleeve is mounted, into the fastening hole; a step (S400) of fixing the fastening rod to the fastening hole by radially expanding the sleeve; and a step (S500) of fixing the washing machine to the fastening rod.

If the porous wall is structurally strong, chemical anchor may not be needed. Thus, the washing machine can be mounted on the porous wall 10 with reduced installation components and simplified installation process.

As described above, according to embodiments of the present disclosure, it is possible to securely install a washing machine on a porous wall having cavities. Furthermore, vibration caused by washing machine operations, especially in dewatering and rinsing cycles, can be attenuated and restrained from being transmitted to the porous wall. Thus, noise generated by vibration can be prevented. This can also significantly reduces the risk of the washing machine falling from the wall due to failure of the fastening mechanism.

Although exemplary embodiments of the present disclosure are described above with reference to the accompanying drawings, those skilled in the art will understand that the present disclosure may be implemented in various ways without changing the necessary features or the spirit of the present disclosure.

Therefore, it should be understood that the exemplary embodiments described above are not limiting, but only an example in all respects. The scope of the present disclosure is expressed by claims below, not the detailed description, and it should be construed that all changes and modifications achieved from the meanings and scope of claims and equivalent concepts are included in the scope of the present disclosure.

From the foregoing, it will be appreciated that various embodiments of the present disclosure have been described herein for purposes of illustration, and that various modifications may be made without departing from the scope and spirit of the present disclosure. The exemplary embodiments disclosed in the specification of the present disclosure do not limit the present disclosure. The scope of the present disclosure will be interpreted by the claims below, and it will be construed that all techniques within the scope equivalent thereto belong to the scope of the present disclosure.

What is claimed is:

1. A washing machine comprising:
a rear panel; and
a fastener kit configured to affix the washing machine to a wall through the real panel,
wherein the fastener kit comprises a fastening rod and a sleeve,
wherein one portion of the fastener kit is configured to be inserted in a fastening hole formed in the wall and another portion of the fastener kit is configured to be inserted in the rear panel and coupled to the rear panel when the rear panel is mounted on the wall, and the sleeve is configured to be disposed on the one portion of the fastening rod,
wherein the sleeve comprises:
a cylindrical columnar first sleeve; and
a cylindrical columnar second sleeve comprising a slit extending in a longitudinal direction of the fastening rod and being configured to be radially expanded in the fastening hole to make contact with the fastening hole,
wherein the slit is formed in a sidewall of the cylindrical columnar second sleeve,
wherein one or more of the sleeves are mounted to said one portion of the fastening rod,
wherein a length of the one or more sleeves is based on an insertion length of the fastening rod inserted into the fastening hole, and
wherein the sleeves are connected together serially.

2. The washing machine of claim 1 further comprising:
a tub integrally formed with the rear panel and configured to contain washing water; and
a rotatable drum disposed inside the tub.

3. The washing machine of claim 1, wherein a chemical anchor is disposed in the fastening hole to enhance affixation between the wall and the first end portion.

4. The washing machine of claim 1, wherein the fastener kit further comprises:
a pressing nut, wherein tightening the pressing nut along the fastening rod causes the sleeve to radially expand and press against an inner surface of the fastening hole; and
a fastening nut configured to fix the another end portion of the fastening rod to the rear panel.

5. The washing machine of claim 1, wherein the fastener kit further comprises a shock-absorbing member disposed between the wall and the rear panel for absorbing vibration caused by an operation of the washing machine.

6. A washing machine comprising:
an exterior housing;
a tub configured to contain washing water; and
a rear panel configured to couple the washing machine to a wall through a fastener kit and a chemical anchor,
wherein, when the rear panel is affixed to the wall, the chemical anchor is disposed in a fastening hole formed in the wall,
wherein the fastener kit comprises a fastening rod and a sleeve,
wherein one portion of the fastener kit is configured to be inserted in the fastening hole and another portion of the fastener kit is configured to be inserted in the rear panel and coupled to the rear panel when the rear panel is mounted on the wall, and the sleeve is configured to be disposed on the one portion of the fastening rod,
wherein the sleeve comprises:
a cylindrical columnar first sleeve; and
a cylindrical columnar second sleeve comprising a slit extending in a longitudinal direction of the fastening rod and being configured to be radially expanded in the fastening hole to make contact with the fastening hole,
wherein the slit is formed in a sidewall of the cylindrical columnar second sleeve, and
wherein one or more of the sleeves are selectively and serially mounted to said one portion of the fastening rod based on an insertion length of the fastening rod inserted into the fastening hole, and
wherein the sleeves are connected together serially.

7. The washing machine of claim 6, wherein the fastener kit further comprises:
a pressing nut, wherein tightening the pressing nut causes the sleeve to radially expand and press against an inner surface of the fastening hole; and
a fastening nut configured to fix the another end portion of the fastening rod to the rear panel.

8. The washing machine of claim 6, wherein the fastener kit further comprises a shock-absorbing member disposed between the wall and the rear panel for absorbing vibration caused by operation of the washing machine.

9. A method of installing a wall-mounted washing machine on a wall, the method comprising:
forming a fastening hole on the wall;
inserting a fastening rod with a sleeve in the fastening hole, the sleeve comprising a cylindrical columnar first sleeve and a cylindrical columnar second sleeve having a slit extending in a longitudinal direction of the fastening rod, the slit being formed in a portion of a sidewall of the cylindrical columnar second sleeve;
causing the sleeve to radially expand to affix the fastening rod in the fastening hole; and
coupling the washing machine to the fastening rod,
selecting one or more of the sleeves based on an insertion length of the fastening rod inserted into the fastening hole; and
coupling the sleeve to the fastening rod,
wherein the sleeve radially expands to make contact with an inner surface of the fastening hole when a pressure is exerted on one end of the sleeve, and wherein the sleeves are connected together serially.

10. The method of claim 9, further comprising disposing a chemical anchor in the fastening hole.

11. The method of claim 9, wherein the fastening hole has a predetermined depth and extends through two or more cavities in the wall.

* * * * *